United States Patent
Balasubramanian et al.

(10) Patent No.: US 10,324,799 B2
(45) Date of Patent: Jun. 18, 2019

(54) ENHANCED APPLICATION WRITE PERFORMANCE

(71) Applicant: INTERNATIONAL BUSINESS MACHINES CORPORATION, Armonk, NY (US)

(72) Inventors: Shankar Balasubramanian, Bangalore (IN); Venkateswara R. Puvvada, Inkollu (IN); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/718,825

(22) Filed: Sep. 28, 2017

(65) Prior Publication Data

US 2019/0095284 A1    Mar. 28, 2019

(51) Int. Cl.
*G06F 3/06* (2006.01)
*G06F 12/0868* (2016.01)
*G06F 12/128* (2016.01)
*G06F 11/14* (2006.01)
*G06F 9/54* (2006.01)

(52) U.S. Cl.
CPC .......... *G06F 11/1435* (2013.01); *G06F 3/065* (2013.01); *G06F 3/067* (2013.01); *G06F 3/0619* (2013.01); *G06F 9/547* (2013.01); *G06F 11/1451* (2013.01); *G06F 12/0868* (2013.01); *G06F 12/128* (2013.01); *G06F 2212/621* (2013.01)

(58) Field of Classification Search
CPC ........ G06F 3/0619; G06F 3/065; G06F 3/067; G06F 9/547; G06F 11/1435; G06F 11/1451; G06F 12/0868; G06F 12/128
See application file for complete search history.

(56) References Cited

U.S. PATENT DOCUMENTS

| 8,935,336 | B2 | 1/2015 | Sedan et al. |
| 9,336,132 | B1* | 5/2016 | Aron .......................... G06F 3/06 |
| 9,639,287 | B1* | 5/2017 | Malina .................. G06F 3/0619 |
| 2013/0185526 | A1* | 7/2013 | de la Iglesia ....... G06F 12/0246 711/154 |
| 2017/0011054 | A1 | 1/2017 | Chennamsetty et al. |

OTHER PUBLICATIONS

Eshel et al., "Panache: A Parallel File System Cache for Global File Access," Proceedings of FAST '10: 8th USENIX Conference on File and Storage Technologies, Feb. 23-26, 2010, 14 Pages, USENIX Association, San Jose, CA, USA.
Mell et al., "The NIST Definition of Cloud Computing," National Institute of Standards and Technology, Sep. 2011, p. 1-3, Special Publication 800-145.

* cited by examiner

*Primary Examiner* — Aracelis Ruiz
(74) *Attorney, Agent, or Firm* — Alexis N. Hatzis

(57) ABSTRACT

A method, computer system, and a computer program product for enhanced application write operations is provided. The present invention may include performing a write operation by an application node. The present invention may then include committing the write operation to a local buffer cache. The present invention may then include sending the application node an indication that the write operation was successful. The present invention may then include flushing the local buffer cache to a disk, and the present invention may lastly include sending a Remote Procedure Call (RPC) to a gateway node.

17 Claims, 6 Drawing Sheets

ENHANCED APPLICATION WRITE PERFORMANCE

BACKGROUND

The present invention relates generally to the field of computing, and more particularly to disaster recovery.

Active File Management (AFM) is a feature in IBM Spectrum Scale™ (IBM Spectrum Scale and all IBM Spectrum Scale-based trademarks are trademarks or registered trademarks of International Business Machines Corporation in the United States, and/or other countries) which may allow an application to cache data from one spectrum scale cluster to another. The same technology may be used to replicate data from one spectrum scale cluster to another, which in turn may be used to build a disaster recovery solution between two geographically distributed clusters. When an application writes to an AFM fileset on the primary (e.g., cache) cluster, each write may first be written to the local disk of the cache cluster. Thereafter, a remote procedure call (RPC) may have previously been sent to the gateway node (e.g., the node responsible for replicating the data to the remote cluster). The RPC may have informed the gateway node that the piece of data should be replicated to the remote cluster. However, the described application write path (e.g., inclusive of the RPC) may result in as much as eight times performance degradation.

SUMMARY

Embodiments of the present invention disclose a method, computer system, and a computer program product for enhanced application write operations. The present invention may include performing a write operation by an application node. The present invention may then include committing the write operation to a local buffer cache. The present invention may then include sending the application node an indication that the write operation was successful. The present invention may then include flushing the local buffer cache to a disk, and the present invention may lastly include sending a Remote Procedure Call (RPC) to a gateway node.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
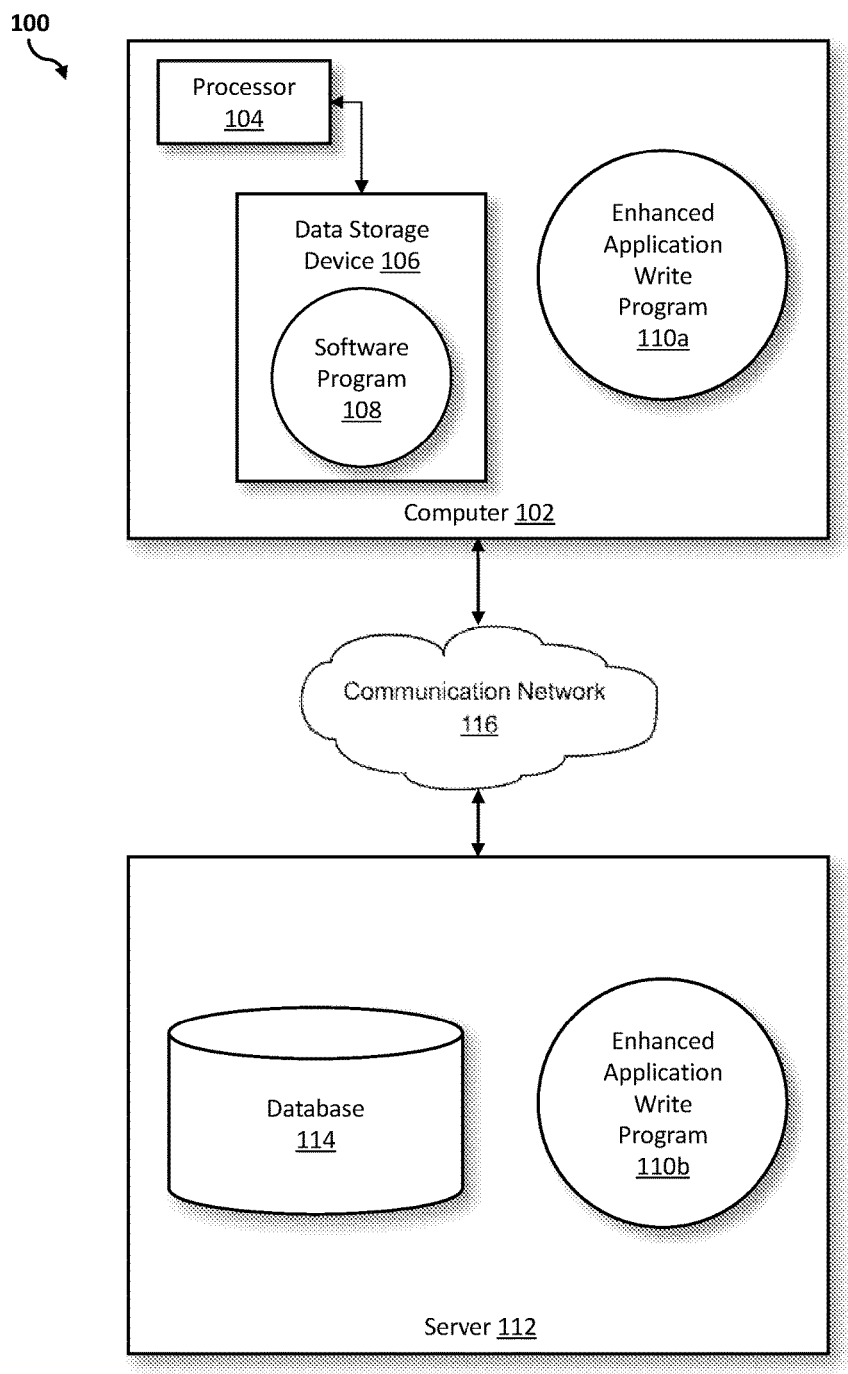
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for enhanced application write performance in Active File Management (AFM) cache technology and AFM disaster recovery technology in IBM Spectrum Scale™. As such, the present embodiment has the capacity to improve the technical fields of file management and disaster recovery by removing the delay introduced by a remote procedure call (RPC). More specifically, an application node may perform a write. The write may then be committed to a local in-memory buffer cache. The application node may inform that the write was successful. The local in-memory buffer cache may then be flushed to a disk. An RPC may then be sent to a local gateway node.

As described previously, Active File Management (AFM) is a feature in IBM Spectrum Scale™ which may allow an application to cache data from one spectrum scale cluster to another. The same technology may be used to replicate data from one spectrum scale cluster to another, which in turn may be used to build a disaster recovery solution between two geographically distributed clusters. When an application writes to an AFM fileset on the primary (e.g., cache) cluster, each write may first be written to the local disk of the cache cluster. Thereafter, a remote procedure call (RPC) may be sent to the gateway node (e.g., the node responsible for replicating the data to the remote cluster). The RPC may inform the gateway node that the piece of data should be replicated to the remote cluster. The application node where the write was done may not return success or failure for the write until the gateway node has received a successful acknowledgement for the RPC. This application write path (e.g., inclusive of the RPC) may result in as much as eight times performance degradation.

Therefore, it may be advantageous to, among other things, remove the delay introduced by the RPC by removing the RPC from the application write path.

According to at least one embodiment, AFM may be a feature in IBM Spectrum Scale™ which allows an application to cache data from one spectrum scale cluster to another spectrum scale cluster. The technology may be utilized to replicate data from one spectrum scale cluster to another, which in turn may be used to build a disaster recovery solution between two geographically distributed clusters. Thus, it may be used to implement disaster recovery solutions in cluster file systems (e.g., IBM Spectrum Scale™). AFM may allow a user to create filesets on the primary (e.g., cache) cluster and then write to the created primary filesets, which are replicated to secondary filesets on the secondary cluster. The primary and secondary filesets may have an AFM or disaster recovery relationship for this functionality to work.

According to at least one embodiment, when an application performs a write operation on the primary fileset, the write operation may be received by the IBM Spectrum Scale™ cluster and the write operation may be written to a local buffer cache. Thereafter, the application node may commit the write operation to the local buffer cache, and may report that the write operation was successful (e.g., by returning an indication of success). The buffer cache may then be flushed to a disk located anywhere within the IBM Spectrum Scale™ cluster, and an RPC may be sent to the local gateway node. The gateway node may be responsible for replicating the data to the secondary cluster.

According to at least one embodiment, gateway node functionality may be located on different physical nodes, which may be separated from the application node over the network (e.g., communication network 116). This separation may ensure that the gateway node has enough memory resources to perform the replication requests from all application nodes in the IBM Spectrum Scale™ cluster. Multiple gateway nodes may also be defined to distribute the replication load from multiple application nodes.

Previously, the write operation may not have returned to the application until the RPC issued by the application was acknowledged by the gateway node. This may have resulted in significant performance delays in write operations, and particularly in small write operations of less than 256K. This may also have resulted in write performance degradation in large write operations. Performance degradation may be noted of up to eight times worse than a General Parallel File System (GPFS™) fileset (GPFS and all GPFS-based trademarks are trademarks or registered trademarks of International Business Machines Corporation in the United States, and/or other countries). Performance degradation may be an issue in disaster recovery solutions using AFM, where the primary fileset may be expected to have the same write performance as a GPFS™ fileset.

According to at least one embodiment, RPCs may be removed from the application write path to eliminate delay introduced by an RPC. An RPC may instead be issued at the time data may be flushed to a disk. This may be done when the IBM Spectrum Scale™ cluster does a buffer flush of the data to the disk. The removal of the RPCs from the application write path may result in significant performance improvement in application writes.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an enhanced application write program 110a. The networked computer environment 100 may also include a server 112 that is enabled to run an enhanced application write program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the enhanced application write program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the enhanced application write program 110a, 110b (respectively) to remove delay introduced by a remote procedure call (RPC) by removing the RPC from an application write path. An RPC may instead be issued when application data is flushed to a disk, which may be done when the IBM Spectrum Scale™ does a buffer flush of the data to the disk. The enhanced application write method is explained in more detail below with respect to FIGS. 2 and 3.

Figure 2:
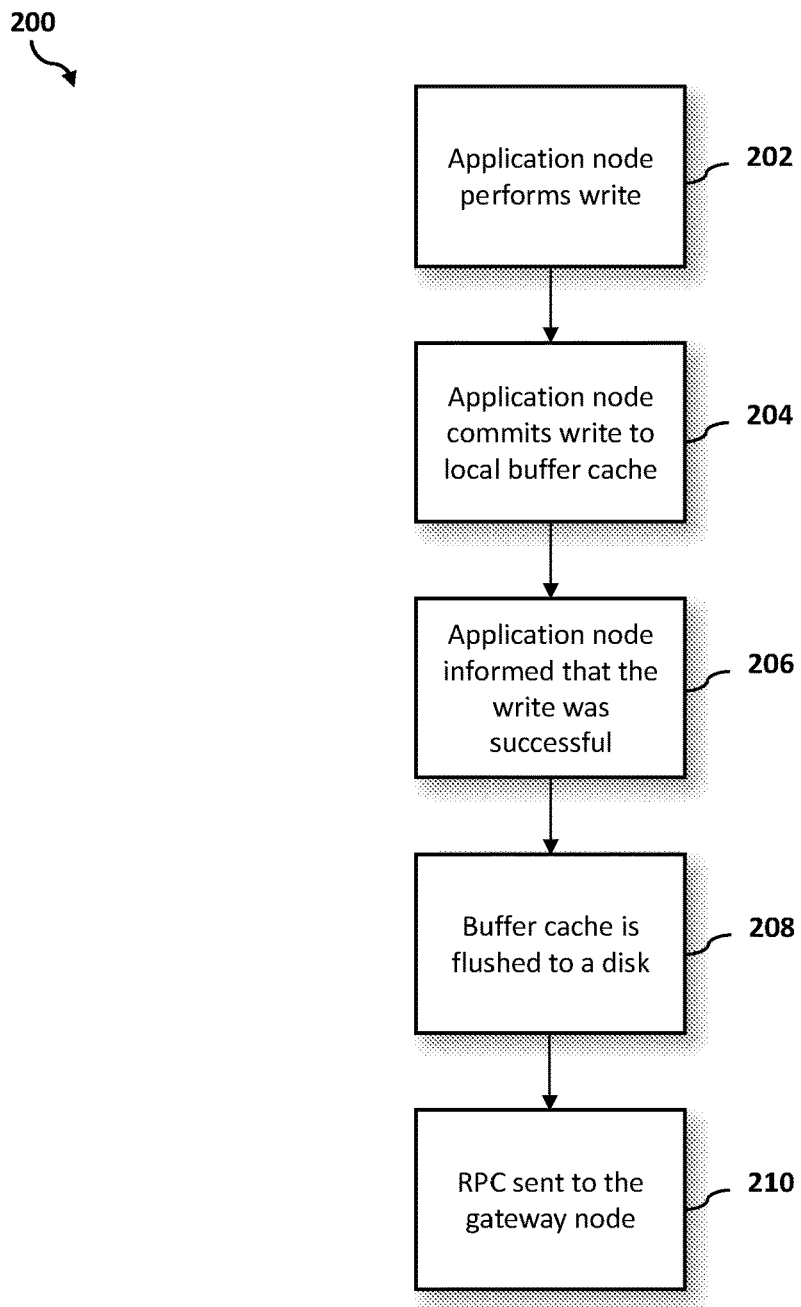
FIG. 2 is an operational flowchart illustrating a process for enhanced application write according to at least one embodiment.

Referring now to FIG. 2, an operational flowchart illustrating the exemplary enhanced application write process 200 used by the enhanced application write program 110a and 110b according to at least one embodiment is depicted.

At 202, the application node performs a write. The application node may use the write( ) system call to perform the write operation. The write operation may be done on an application node within an IBM Spectrum Scale™ cluster. IBM Spectrum Scale™ may be a cluster file system which may have billions of files and terabytes of data. Active File Management (AFM) may permit data to be written (e.g., replicated) from one independent and geographically separated cluster to another. For example, an application may perform a write operation from cluster A to cluster B, and the file system may deliver the write.

Next, at 204, the application node commits the write to the local buffer cache. When an application node performs a write operation using the write( ) system call, as previously described, data may be copied from the user space directly into a buffer cache in the kernel. At this point, data may be stored in the buffer cache waiting to be flushed to a disk. Committing the write operation to a local buffer cache may include storing the write operation in a buffer cache queue. Write operations committed to the buffer cache queue may later be flushed to the gateway node in the order in which they were received. Sequential data, however, may be detected by the local buffer cache and processed together, even if written to the buffer cache queue separately and not sequentially.

Previously, the application node may have sent a Remote Procedure Call (RPC) to the gateway node when the write operation was committed to the buffer cache. However, although the application node may still commit the write operation to the local buffer cache, the RPC may be sent to the gateway node at a later time, when the buffer cache is flushed to a disk.

Next, at 206, the application node is informed that the write was successful. The application node may perform a write operation to the local buffer cache and may be returned an indication, after the write( ) system call has completed, that the write has been received (e.g., by a predefined indicator of success). The indication may note success or failure of the write operation. On success of the write( ) operation, the number of bytes written may be returned. A value of zero may indicate that nothing was written. On error, a value of −1 may be returned, and a variable errno, which may be a numerical value representing the actual error, may be set. The present embodiment may only cover the successful write scenario where data coming from the application node may be copied to a buffer cache.

Next, at 208, the buffer cache is flushed to a disk. A buffer cache in a file system (e.g., a clustered file system such as IBM Spectrum Scale™) may be an in-memory cache where write operations are accumulated for performance reasons, the buffer may be flushed based on a buffer flush trigger (e.g., the buffer cache is full, a time threshold is reached, or transferred data is immediately required by the receiving node), and the entirety of the buffer may be flushed to a disk. When this happens, for example, all data stored in memory may be written (e.g., committed) to the disk and stored. This may be referred to as a buffer flush. Further, data may be flushed to a disk on any node in the IBM Spectrum Scale™ cluster. That is because the IBM Spectrum Scale™ cluster may be completely distributed and accessible to all nodes within the cluster. For example, the IBM Spectrum Scale™ cluster may include two nodes. That is, there are two physical machines connected to the IBM Spectrum Scale™ cluster. Each of the two nodes may have software which permits them to access each of the two shared disks (e.g., a virtual disk whereby data written to the disk on either node may be accessible by both nodes of the cluster).

Lastly, at 210, an RPC is sent to the gateway node. The Remote Procedure Call (RPC) may be a mechanism used to send a message from one node in a cluster to another node in the cluster. To ensure that the data is replicated from the home cluster to the remote cluster, the RPC may need to be sent to the gateway node. This may be done when the in-memory buffer cache is flushed to a disk, so that the sending of the RPC may not impact the timing of application write operations. This way, the RPC may be taken out of the application write path and the application may no longer incur RPC performance degradation. Further, sending the RPCs to the gateway node when the data is flushed to a disk ensures that the gateway node recognizes that data has been flushed to a disk, and signals the gateway node to replicate the data to the remote cluster.

For example, removing the RPC from the application write level, and permitting the RPC to be sent at the file system level, when the buffer flush happens, may significantly improve performance for both small and large write operations. The previous functionality may have included an application performing a write operation, the file system delivering the write operation, and an RPC issuing to the gateway node (e.g., the node that performs the specific function of receiving the data which may need to be replicated). The application node and the gateway node may be on different physical machines within the IBM Spectrum Scale™ cluster. The gateway node may have previously received the RPC from the application node, recorded the message contained within the RPC in a message queue, and responded to the RPC by sending an acknowledgement back to the application node that the RPC has been received. Given this previous functionality, for example, when a series of small write operations is performed (e.g., one of less than 256K), an RPC may be sent for each write operation, and the timeliness of performance may be affected (e.g., a delay may be introduced).

Therefore, by removing the RPC from the application write path, multiple RPCs may be aggregated and sent together as one. For example, in the case of a series of small write operations, all small write operations performed by the application node may be committed to the local buffer cache, and one RPC for all write operations may be sent to the gateway node after the buffer cache is flushed to a disk. Since the single RPC may be sent at the time the buffer cache is flushed to a disk, the performance of the file system may be restored. Further, messages in the buffer cache of the gateway node may be combined so that replication of multiple portions of data sent by one application node may be issued together in one single RPC. The buffer cache may internally have a mechanism to detect when multiple write operations are involved, and may therefore coalesce (e.g., combine) the multiple RPCs itself. Further, the buffer cache may have an internal mechanism to detect when sequential data is received, so that even if data is required to be processed out of order by the buffer cache, the sequential data may be written to the disk as one. The benefit may be ensuring that the number of RPCs sent is the same as the number of write operations the buffer flush commits to the disk.

The gateway node may be prompted prior to data being flushed to the disk that the RPC may be sent to the gateway node. This may be beneficial, as described previously, as the buffer flush may optimize the sequential write operations of the multiple blocks into one write operation, resulting in optimization and reduction of RPCs sent to the gateway node. Further, the buffer flush may be completely done asynchronous to write operations, resulting in the removal of a timing delay caused by an RPC from application write operations. This enhanced mechanism for sending an RPC to the buffer flush may ensure data consistency at the application node, and may further ensure that the gateway node does not miss any RPCs (e.g., that the replication is done correctly).

For example, a directory (e.g., a collection of files) may have a buffer associated with it, and data may be stored within the buffer. A directory (e.g., dir1) and created file (e.g., file1) may be seen inside the buffer, which may make note of a file (e.g., file1) with mode (e.g., a data structure that stores the file's metadata and contains information concerning the data, it's attributes, and its storage location). When the buffer cache is flushed to a disk, as previously described at 208, the directory buffer may also be flushed to the disk. Since the RPC may be sent to the gateway node upon the occurrence of the buffer flush, the data buffer and metadata buffer may need to be distinguished, and the buffer associated with the data itself may be associated with the AFM. Therefore, an RPC may not be issued for every write that the buffer flush does. The RPC may be issued for the data and not for associated metadata.

In a second example, the AFM may have multiple nodes, and the AFM may be used for caching (e.g., where data is read) or for disaster recovery (e.g., where data is replicated from one node to another). The use of AFM in disaster recovery functions may focus on the write path, which is concerned with causing the replication to occur, and not on the read path. When AFM reads data from a node into cache, the data may be taken and cached locally. Thereafter, when AFM cache tries to read the data from a local cluster, the data may be read at the gateway node. Once the data is read, the data may also be stored at the buffer at the gateway node. Thereafter, the buffer may be flushed to a disk, and since the RPC may be issued at the buffer flush, as described previously, the result may be an RPC sent only when the data is written not and when the data is read.

In a third example, the enhanced application write program 110a, 110b may be implemented in data migration scenarios, in which portions of data may be transferred from an old system onto a new system. In this case, data may be replicated from cache, and may not be replicated on the original node (e.g., the old system). Thereafter, when the data is updated, the data may not be updated on the old system, and may instead be transferred onto the new system. In this example, an RPC may not be sent back to the gateway node of the old system, and may instead remain on the data migration node (e.g., the new system).

According to a fourth example, the enhanced application write program 110a, 110b may be implemented in disaster recovery scenarios, when a primary node is taken down for maintenance and the application is failed over to the disaster recovery side. The applications utilized on the primary node may be moved from the primary cluster to the disaster recovery cluster based on the fact that the primary cluster is not usable. After several days, functionality of the primary cluster may return, and the user may choose to move the applications back to the original primary cluster. To do so, any changes that were made on the disaster recovery cluster must be brought back to the original primary cluster. All data must also be transferred back to the original primary cluster. The original primary cluster may have a disaster recovery mechanism which enables a user to apply an update on the original primary cluster and the disaster recovery cluster (i.e., acting primary cluster) and effect the changes made on the acting primary cluster to the original primary cluster. During this update, an RPC should not be issued in the buffer flush since changes are being brought back from the acting primary cluster to the original primary cluster.

Figure 3:
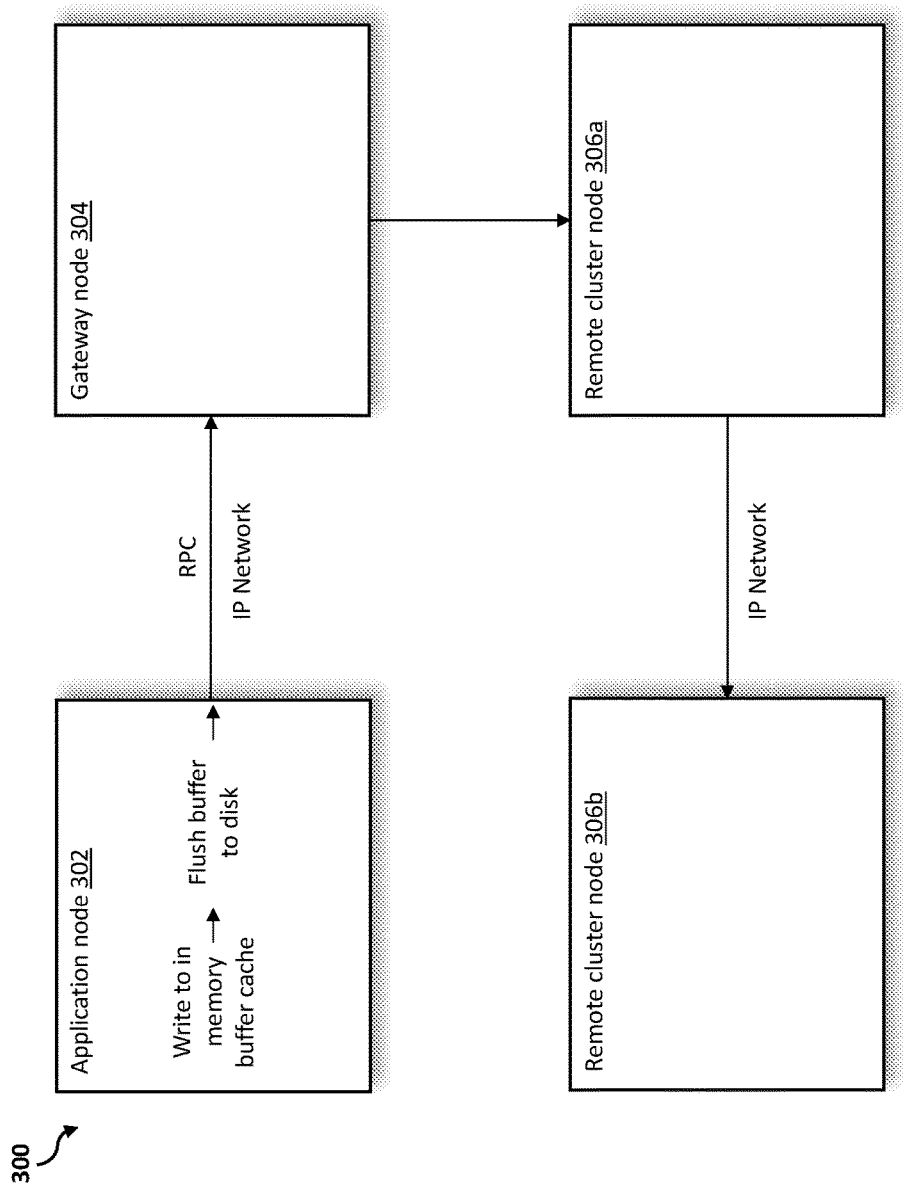
FIG. 3 is a block diagram of the enhanced application write process according to at least one embodiment.

FIG. 3 is a block diagram 300 of the enhanced application write process according to at least one embodiment. As stated previously, the application node 302 may perform a write operation. The application node 302 may then commit the write operation to a local buffer cache. Unlike the previous system, when an RPC may have been sent to the gateway node with each application write operation, an RPC may now be sent across the IP Network (e.g., communication network 116) to the gateway node 304 when the buffer cache is flushed to a disk. This may eliminate delay introduced by the write operation and avoid performance delays. Thereafter, remote cluster nodes 306a-b may share data received by the gateway node 304.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
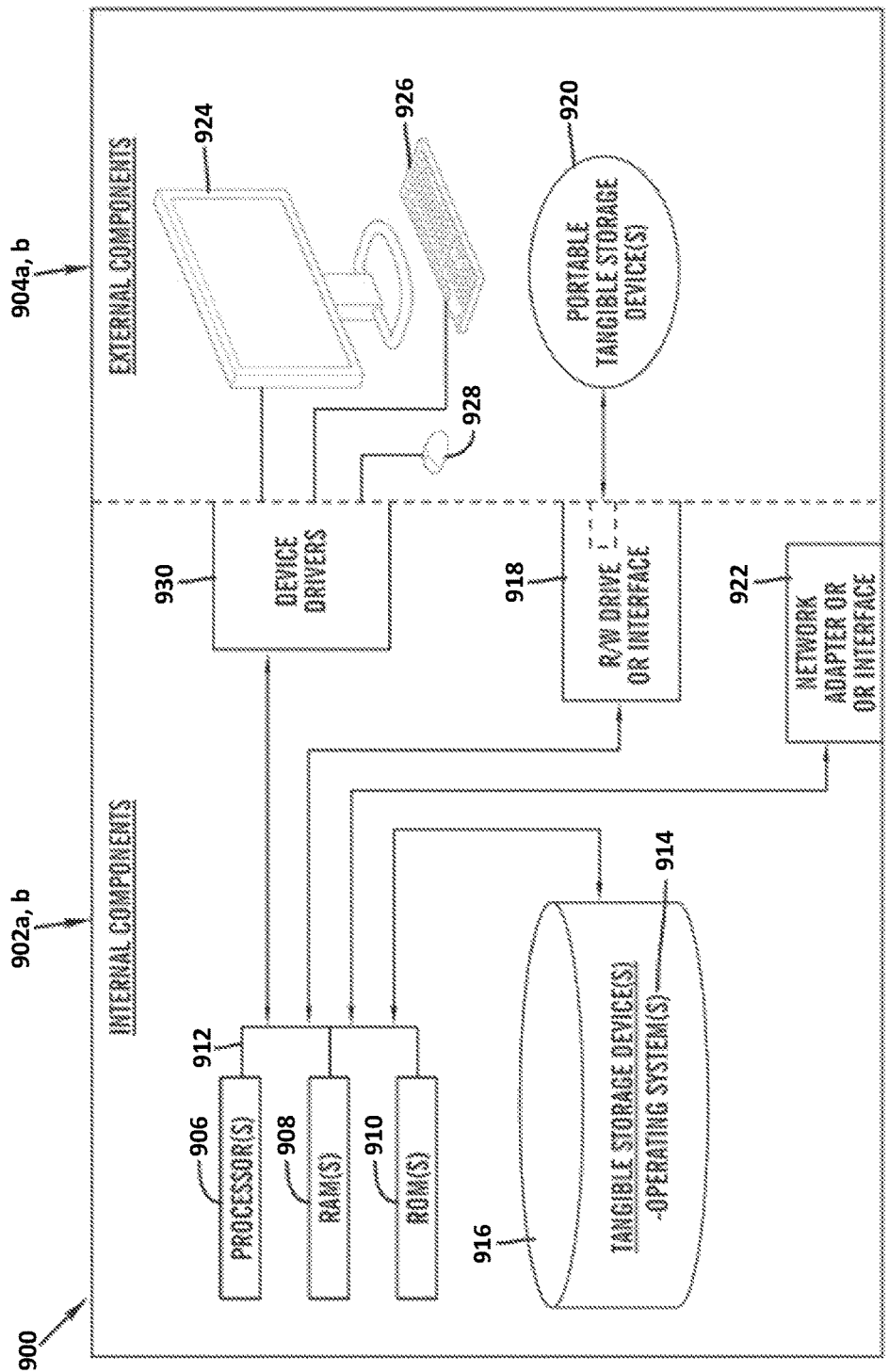
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the enhanced application write program 110a in client computer 102, and the enhanced application write program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the enhanced application write program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the enhanced application write program 110a in client computer 102 and the enhanced application write program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the enhanced application write program 110a in client computer 102 and the enhanced application write enhanced application write program 110b in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
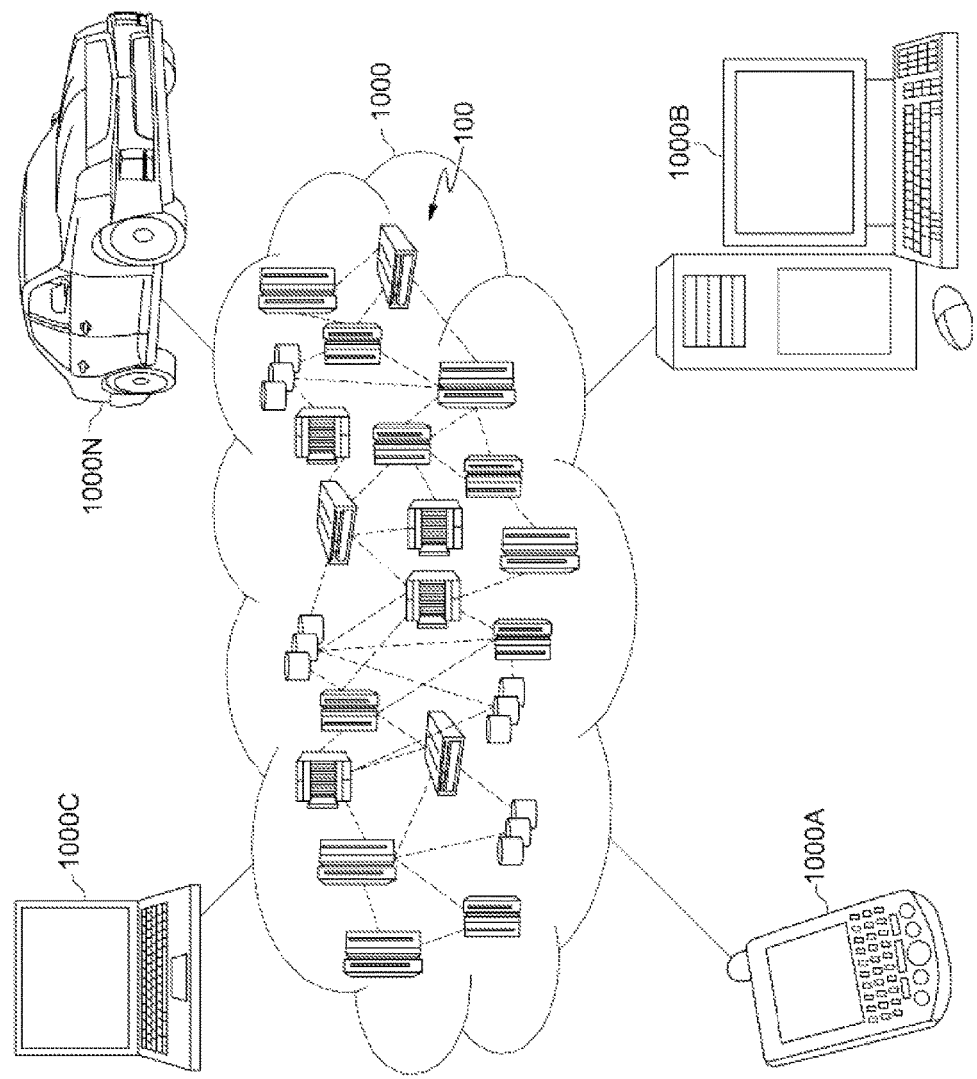
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
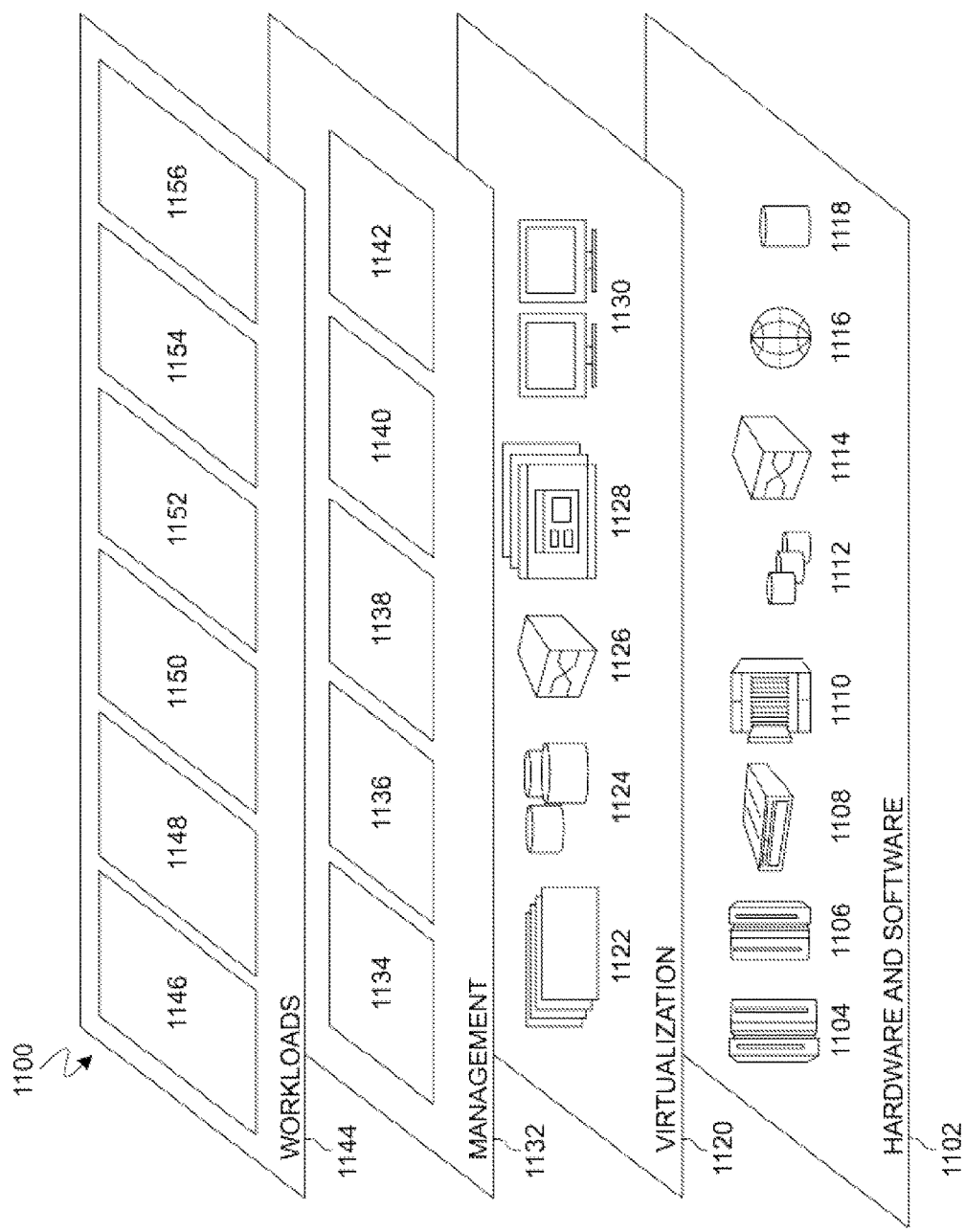
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and enhanced application write 1156. An enhanced application write program 110a, 110b provides a way to improve performance and eliminate delay in application writes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enhanced application write operations, the method comprising:
    performing a write operation by an application node;
    committing the write operation to a local buffer cache;
    sending the application node an indication that the write operation was successful;
    flushing the local buffer cache to a disk;
    sending a Remote Procedure Call (RPC) to a gateway node;
    generating a combined RPC based on combining one or more writes on the local buffer cache; and
    sending the generated combined RPC to the gateway node.

2. The method of claim 1, wherein performing the write by the application node further comprises:
    a primary fileset on a primary cluster and a secondary fileset on a secondary cluster,
        wherein the write is performed by the application node on the primary fileset on the primary cluster and the write is replicated to the secondary fileset on the secondary cluster.

3. The method of claim 1, wherein committing the write to the local buffer cache further comprises:
    storing the write in a buffer cache queue.

4. The method of claim 1, wherein sending the application node the indication that the write operation was successful further comprises:
    returning an indication of success to the application node.

5. The method of claim 1, wherein flushing the local buffer cache to the disk is based on a buffer flush trigger, wherein the buffer flush trigger is selected from the group consisting of a full buffer cache, a time threshold, and a plurality of transferred data required by a receiving node.

6. The method of claim 1, wherein the disk is located on a node in the cluster, and wherein flushing the local buffer cache to the disk further comprises:
    committing the write to the disk located on the node in the cluster.

7. A computer system for enhanced application write operations, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    performing a write operation by an application node;
    committing the write operation to a local buffer cache;
    sending the application node an indication that the write operation was successful;
    flushing the local buffer cache to a disk;
    sending a Remote Procedure Call (RPC) to a gateway node;
    generating a combined RPC based on combining one or more writes on the local buffer cache; and
    sending the generated combined RPC to the gateway node.

8. The computer system of claim 7, wherein performing the write by the application node further comprises:
    a primary fileset on a primary cluster and a secondary fileset on a secondary cluster,
        wherein the write is performed by the application node on the primary fileset on the primary cluster and the write is replicated to the secondary fileset on the secondary cluster.

9. The computer system of claim 7, wherein committing the write to the local buffer cache further comprises:
storing the write in a buffer cache queue.

10. The computer system of claim 7, wherein sending the application node the indication that the write operation was successful further comprises:
returning an indication of success to the application node.

11. The computer system of claim 7, wherein flushing the local buffer cache to the disk is based on a buffer flush trigger, wherein the buffer flush trigger is selected from the group consisting of a full buffer cache, a time threshold, and a plurality of transferred data required by a receiving node.

12. The computer system of claim 7, wherein the disk is located on a node in the cluster, and wherein flushing the local buffer cache to the disk further comprises:
committing the write to the disk located on the node in the cluster.

13. A computer program product for enhanced application write operations, comprising:
one or more computer-readable storage media and program instructions stored on at least one of the one or more tangible storage media, the program instructions executable by a processor to cause the processor to perform a method comprising:
performing a write operation by an application node;
committing the write operation to a local buffer cache;
sending the application node an indication that the write operation was successful;
flushing the local buffer cache to a disk;
sending a Remote Procedure Call (RPC) to a gateway node;
generating a combined RPC based on combining one or more writes on the local buffer cache; and
sending the generated combined RPC to the gateway node.

14. The computer program product of claim 13, wherein performing the write by the application node further comprises:
a primary fileset on a primary cluster and a secondary fileset on a secondary cluster,
wherein the write is performed by the application node on the primary fileset on the primary cluster and the write is replicated to the secondary fileset on the secondary cluster.

15. The computer program product of claim 13, wherein committing the write to the local buffer cache further comprises:
storing the write in a buffer cache queue.

16. The computer program product of claim 13, wherein flushing the local buffer cache to the disk is based on a buffer flush trigger, wherein the buffer flush trigger is selected from the group consisting of a full buffer cache, a time threshold, and a plurality of transferred data required by a receiving node.

17. The computer program product of claim 13, wherein the disk is located on a node in the cluster, and wherein flushing the local buffer cache to the disk further comprises:
committing the write to the disk located on the node in the cluster.

* * * * *